Jan. 3, 1933.  C. H. BOUCHER  1,893,268
UNDERFLOOR WIRING DUCT SYSTEM
Filed Dec. 9, 1929  3 Sheets-Sheet 1
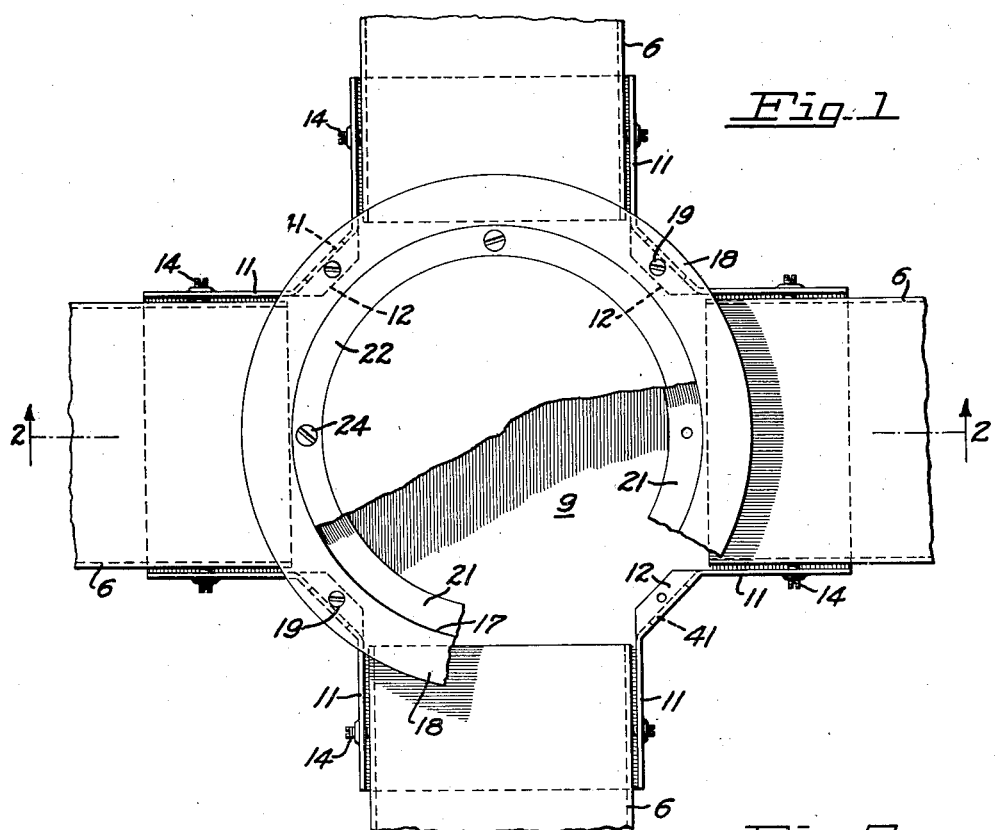
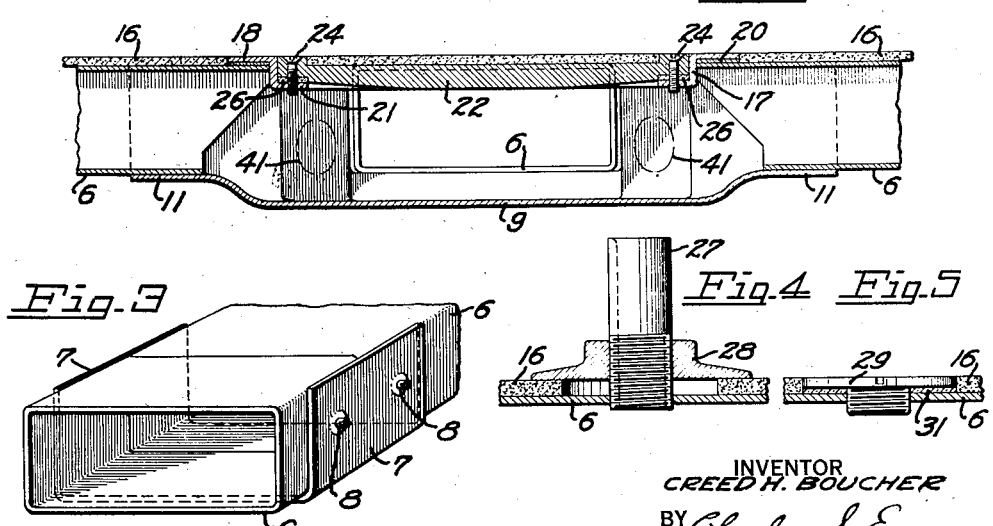
INVENTOR
CREED H. BOUCHER
BY Charles S. Evans
HIS ATTORNEY

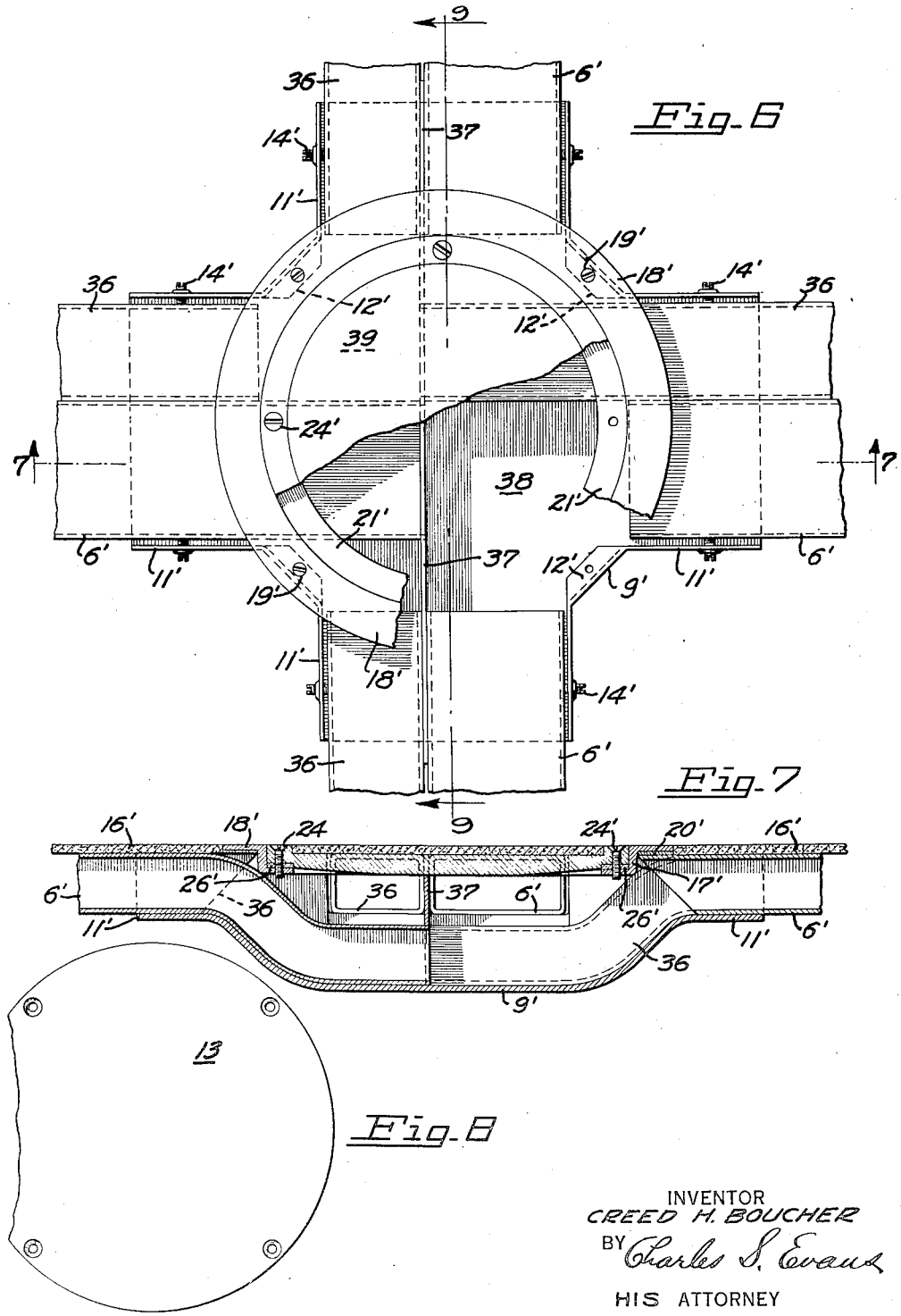

Jan. 3, 1933.　　　　C. H. BOUCHER　　　1,893,268
UNDERFLOOR WIRING DUCT SYSTEM
Filed Dec. 9, 1929　　　3 Sheets-Sheet 3
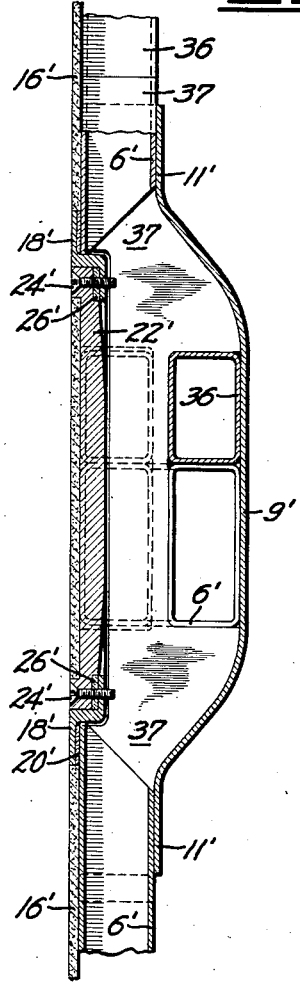
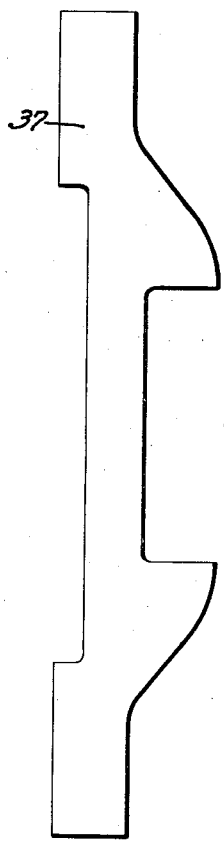
INVENTOR.
CREED H. BOUCHER
BY Charles S. Evans
HIS ATTORNEY Patented Jan. 3, 1933

1,893,268

UNITED STATES PATENT OFFICE

CREED H. BOUCHER, OF BURLINGAME, CALIFORNIA

UNDERFLOOR WIRING DUCT SYSTEM

Application filed December 9, 1929. Serial No. 412,731.

My invention relates to wiring duct systems and particularly to such systems for underfloor installation of telephone and power wires.

An object of my invention is to provide a system of underfloor wiring ducts which may be tapped at any point, either at the time of installation or at any future time.

Another object of my invention is to provide a system having separate channels for telephone, power, and miscellaneous wiring such as signaling systems.

Still another object of my invention is to provide an underfloor wire system which may be installed at a fraction of the cost of conventional systems.

A further object of my invention is to provide an underfloor duct system suitable for use in covered floors in which junction boxes are provided having covers which are inconspicuous, level with the floor covering, and accessible at all times.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Proper distribution of wiring circuits is one of the serious problems of modern office building construction. Large open offices with many desks are increasingly in favour, and most if not all of the desks in such offices must be supplied not only with telephones, but also with power circuits for dictating machines, computing machines and the like, and in many instances with buzzer or other signal circuits. Where these circuits are run in exposed wiring the difficulty of keeping aisles and passage ways clear becomes more pronounced as the size of offices increases, and the logical solution to the problem is to run the wiring circuits beneath the floor.

Various systems of underfloor ducts have been marketed, the ducts being buried in the concrete floors. Where this construction is adopted it is necessary that the position of the various outlets be predetermined and provision made for tapping the duct before the floor is poured. The addition of new outlets with this system requires an extensive chipping and patching job, cutting away the old floor, inserting the tap or kick-pipe into the duct system, and refilling the cavity with concrete.

It is obvious that in such a system many junction boxes must be provided, and since these junction boxes must be completely closed against the entry of concrete, and since they must each have an opening above the floor surface, they have been expensive and difficult to install. The large number of taps, many of which will necessarily be unused in actual practice, has also operated to make the system an expensive one.

In general terms, the system of my invention comprises flat-topped ducts which are installed level with the surface of the floor. Junction boxes are provided for these ducts having open-topped bodies and trough-shaped connecting nipples for receiving the ends of the duct. The covers for these bodies overlie the ends of the ducts and serve to close the tops of the boxes and to hold the ends of the ducts in position. In cases where wires of different classes, such as telephone and power wires, are to be carried by the system, separate ducts are used for each class of wiring, the ducts being laid parallel and entering the junction boxes through common connecting nipples. Within the boxes the wires are kept separate by flat baffle plates, which are held in place by projecting ends extending between the parallel ducts and gripped thereby. The baffle plates may be apertured to permit the passage of certain of the ducts therethrough. By means of the baffles the junction boxes are divided into compartments, each compartment having but a single class of wiring therein. Since the ducts are level with the floor surface they may be tapped at any point, and kick-pipes inserted. The latter preferably are threaded directly into the upper surface of the duct, and carry flanges which may be screwed down above the floor covering to clamp it against the floor on the top of the duct and also to give stability to the kick-pipe.

Referring to the drawings:

Figure 1 is a plan view showing a junction box with four entering ducts for a single class of wiring.

Figure 2 is a sectional view taken on the line 2—2 of Figure 1.

Figure 3 is a fragmentary perspective view showing the type of connector used for duct sections.

Figure 4 is a fragmentary sectional view illustrating a kick-pipe used for tapping the duct.

Figure 5 is a similar view showing the closure used where a tap is abandoned and the kick-pipe removed.

Figure 6 is a view similar to Figure 1 showing a junction box for use with ducts of different classes and having baffles arranged therein.

Figure 7 is a sectional view similar to Figure 2, the plane of section being on the line 7—7 of Figure 6.

Figure 8 is a plan view showing the temporary cover plate which is used in installing the duct system.

Figure 9 is a sectional view taken in a plane indicated by the line 9—9 of Figure 6.

Figure 10 is a detailed view showing the baffle plate.

A preferred embodiment of my invention comprises ducts 6, preferably of rust-proofed steel and of rectangular cross-section. The ducts are laid before the floor in which they are to be installed is poured, being positioned with their upper surfaces at the level of the finished floor.

The ducts are formed in sections of convenient lengths which are joined by trough-shaped connecting nipples 7, (see Figure 3) the nipples being shaped to conform to the lower part of the duct and having their upper edges preferably level with the upper duct surface. The nipples are secured to the ducts by suitable fasteners such as the set-screws 8.

Junction boxes are used where the duct lines branch or intersect. These boxes comprise open-topped bodies 9, preferably octagonal in form, and having trough-shaped connecting nipples 11 extending outwardly from their four longer sides. Lugs 12 are bent inwardly from the shorter sides of the octagonal body, and are drilled and tapped for the attachment of the cover plate. The body proper is preferably somewhat deeper than the ducts themselves, and both the upper edges of the connecting nipples and the inturned attachment lugs 12 are coplanar with the tops of the ducts 6.

In installing the system, a temporary cover plate 13, which overlies the ends of the ducts and aids the set-screws 14 in securing the ducts to the junction box, is screwed to the lugs 12. The concrete or other floor material is then poured in place about the ducts, and the ducts themselves are used as screeds for establishing the floor level flush with their upper surface. After the concrete has set the temporary cover plates are removed from the junction boxes to permit the installation of the wiring.

The usual floor covering in construction of this class is linoleum or similar material, cemented to the floor surface. It is impractical to take up a covering of this class when it is desired to reach the wiring system, and a cover for the junction boxes is therefore provided which will be flush with the linoleum floor, easily removed and replaced, and inconspicuous when installed.

A circular aperture is cut in the linoleum above the junction box. A ring 17, preferably of brass and having an outwardly extending flange 18 of the same external diameter as the circular opening in the linoleum, is secured to the lugs 12 by means of the counter-sunk screws 18. A gasket 19, which is preferably of soft rubber, but which may be formed of a plurality of paper shims, is positioned beneath the flange; flange and gasket overlying the ends of the ducts in a manner similar to the temporary cover which was used in installing the floor. Since the gasket is compressible the screws 18 may be adjusted to bring the flange level with the linoleum.

The ring 16 also carries a depressed inner flange 21, forming a recess for receiving the cover plate 22, which is also preferably of brass. It is usually preferable to recess the upper surface of the cover plate and inlay a disk of linoleum to match the floor covering. Counter-sunk screws 24 secure the cover plate to the ring 16, and a compressible gasket 26, between the ring and the cover plate, permits the plate to be leveled with the floor surface in the same manner as the ring.

It is obvious that a single piece cover may be substituted for the combination of ring and cover plate in installations where economy is paramount, but this construction not only possesses the disadvantage of an inferior appearance, but also sacrifices the securing effect of the ring while the system is being wired.

The duct may be tapped to provide an outlet at any point along its length. The preferred form of tap comprises a kick-pipe 27 threaded directly in the upper surface of the duct 6. A flange 28 threaded on the kick-pipe is screwed down after the pipe has been inserted into the duct to clamp the linoleum 16 against the duct and floor, serving as a lock nut and also to give added stability to the pipe. Should the outlet be abandoned for any reason the kick-pipe can then be removed and a flat-top screw 29 used to close the duct, the screw being leveled with the floor covering by means of a compressible gasket 31.

Where the duct system is to carry services of various classes the construction shown in Figures 6 and 7 may be used. In the illustration the ducts 6', which may be assumed to carry the telephone service, are paralleled by the ducts 36, for power wires or other forms of service. The junction boxes are in general similar to those already described, the body 9' being deeper, however, and the connecting nipples 11' being wider to accommodate the parallel ducts.

Within the junction box the wiring services are separated by a baffle 37, comprising a flat metal plate shaped to conform with the inner surface of the junction box and having extending ends which fit between the parallel ducts to hold the baffle in position. The baffle-plate is apertured to permit the passage of the ends of the transverse ducts therethrough. It will be seen that in the case illustrated the baffle divides the junction box into a compartment 38 into which all of the telephone ducts 6' open, and another compartment 39 which is entered only by power wires. Still larger junction boxes may be provided where a foreign signal service or other wiring is required as well as telephone and power wires. In this case a plurality of baffles is required, these baffles being installed in precisely the same manner as in the simple system shown.

In multiple systems the closure of the junction boxes is the same as that in the single system, the differences being dimensional only. The parts as shown in Figures 6 and 7 are numbered similarly to those shown in Figures 1 and 2, being distinguished therefrom by accents.

The economies which may be effected by the use of my system are apparent. The system is below the level of the floor, but is not buried therein, and this permits the use of the open-topped junction box which may easily be formed of a single stamping. The cover which overlies the ends of the ducts forms a complete closure, the temporary cover preventing the entry of concrete at the time the floor is formed, while the permanent cover installed later is readily adjustable to the level of the floor covering. The oblique corners of the box between the connecting nipples may be provided with the usual pipe knock-outs 41 for connection with a conduit system. Not only are the open-top boxes cheaper than the usual cast type which must be provided with a completely buried box, but they are also stronger and less likely to break before installation. The floor need not be disturbed in case it is desired to change the location of outlets or to provide new ones.

Although I have referred to my system as installed in a floor, since this constitutes its major use, it is obvious that similar construction may be used in a wall or ceiling, and the term floor as used in the claims is to be considered in this broad sense.

I claim:

1. An underfloor wiring system comprising a plurality of parallel flat-topped ducts, a junction box comprising an open-topped body having trough-shaped nipples for receiving the parallel ends of the ducts, and baffles in said body having ends extending between adjacent ducts to retain said baffles in position.

2. An underfloor wiring system comprising a plurality of parallel flat-topped ducts, a junction box comprising an open-topped body having trough-shaped nipples for receiving the parallel ends of the ducts, and baffles in said body apertured to permit the passage of certain of said ducts therethrough and having ends extending between adjacent ducts to retain said baffles in position.

3. An underfloor wiring system comprising a plurality of parallel rectangular ducts, a junction box comprising an open-topped body having trough-shaped nipples for receiving the ends of the ducts, and baffles in said body having parallel ends extending between adjacent ducts to retain said baffles in position.

4. An underfloor wiring system comprising a plurality of parallel rectangular ducts, a junction box comprising an open-topped body having trough-shaped nipples for receiving the parallel ends of the ducts, and baffles in said body apertured to permit the passage of certain of said ducts therethrough and having ends extending between adjacent ducts to retain said baffles in position.

In testimony whereof, I have hereunto set my hand.

CREED H. BOUCHER.